United States Patent
Klingels

(10) Patent No.: US 6,612,114 B1
(45) Date of Patent: Sep. 2, 2003

(54) COOLING AIR SYSTEM FOR GAS TURBINE

(75) Inventor: Hermann Klingels, Deutenhausen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/018,272

(22) Filed: Mar. 18, 2002

(30) Foreign Application Priority Data

Feb. 29, 2000 (DE) ......................................... 100 09 655

(51) Int. Cl.[7] ................................................. F02C 7/18
(52) U.S. Cl. .......................... 60/785; 60/806; 415/115
(58) Field of Search ........................ 60/782, 785, 806; 415/115, 117

(56) References Cited

U.S. PATENT DOCUMENTS

| | | | |
|---|---|---|---|
| 4,254,618 A | | 3/1981 | Elovic |
| 5,163,285 A | * | 11/1992 | Mazeaud et al. ............. 60/806 |
| 5,468,123 A | | 11/1995 | Guimier et al. |
| 5,577,889 A | * | 11/1996 | Terazaki et al. ............ 415/115 |
| 5,591,002 A | * | 1/1997 | Cunha et al. ............... 415/115 |
| 5,591,007 A | | 1/1997 | Lee et al. |
| 5,782,076 A | * | 7/1998 | Huber et al. ................. 415/115 |
| 5,813,835 A | | 9/1998 | Corsmeier et al. |

FOREIGN PATENT DOCUMENTS

| | | |
|---|---|---|
| DE | 196 29 191 | 5/1998 |
| DE | 197 33 148 | 11/1998 |
| DE | 695 04 240 | 4/1999 |
| EP | 0 414 028 | 2/1991 |
| EP | 0 760 051 | 7/1998 |
| GB | 2 299 378 | 10/1996 |
| JP | 58-129529 | 7/1983 |

* cited by examiner

Primary Examiner—Louis J. Casaregola
(74) Attorney, Agent, or Firm—Kenyon & Kenyon

(57) ABSTRACT

Cooling air system for reducing the thermal load on components in the turbine high-pressure region of gas turbines, having blades/vanes which respectively have a plurality of separate flow chambers for different airflows, and having cooling air guidance from the high-pressure region of the compressor into the blading of the high-pressure region of the turbine. Each of the highly loaded blades/vanes has a front flow chamber, at least one central flow chamber and a rear flow chamber. The cooling guidance includes at least one heat exchanger for a part of the cooling air and a flow connection from the heat exchanger to the front and to the rear flow chambers of each blade/vane, with the cooling air guidance to the central flow chamber of each blade/vane bypassing the heat exchanger.

8 Claims, 2 Drawing Sheets

COOLING AIR SYSTEM FOR GAS TURBINE

FIELD OF THE INVENTION

The present invention relates to a cooling air system for reducing the thermal loading on components in the turbine high-pressure region of gas turbines.

BACKGROUND INFORMATION

In turbines in which the gas temperature is above the permissible material temperature of the blading, it is conventional to cool the blades/vanes with air. The cooling air led through the inside of the blade/vane emerges through a plurality of holes/openings, which may be present in the region of the leading edge and trailing edge of the blade/vane aerofoil, with a part of the air moving over the profile surface as a cooling or insulating film. The cooling air necessary is extracted from the high-pressure region of the compressor and, if appropriate, not until downstream of the combustion chamber diffuser. Due to losses, the inlet pressure must be higher than the outlet pressure necessary in the turbine region. It should be noted that compressor air at higher pressure also has a higher temperature, for which reason the cooling effectiveness decreases so that the cooling air quantity must be increased. This has a doubly negative effect. On the one hand, the cooling air which is not available as an oxidizer for the fuel injected into the combustion chamber reduces the engine power directly and, on the other hand, the aerodynamics of the turbine deteriorate with increasing cooling air quantity, so that the power and efficiency are further reduced.

European Published Patent Application No. 0760 051 describes turbine guide vanes with two separate cooling passages within the vane. The leading edge cooling passage, for internal impingement cooling and external film cooling with air outlet against the hot gas stagnation pressure, requires a high cooling air pressure and is therefore fed with compressor air from one of the rearmost compressor stages near the combustion chamber. The trailing edge cooling passage with air outlet in the flow direction of the hot gas can operate with distinctly less cooling air pressure and is, in this region, fed with compressor air from a compressor stage located further upstream and further removed from the combustion chamber. A disadvantage of this arrangement is that the strongly heated vane cooling edge is cooled in a less effective manner by highly compressed, relatively hot cooling air, with the requirement of a high cooling air quantity per unit time or with the result of an unfavorably high material temperature. The rear vane region is more effectively cooled with compressor air of lower temperature and is therefore less critical. Although the system permits the cooling air throughput to be reduced in the rear vane region and therefore permits the aerodynamics to be improved, additional, life-reducing thermal stresses are to be expected due to the "thermal unbalance" between the front and rear vane parts. The unchanged high leading edge temperature relative to "conventional" cooled vanes also, de facto, permits no improvement with respect to the life.

German Published Patent Application No. 197 33 148 describes a cooling appliance for the first turbine stage of a gas turbine which operates in accordance with a comparable principle to that described above. The guide vanes of the first stage—and, if appropriate, further stages—each have an upstream cooling passage and a downstream cooling passage separate from the upstream cooling passage. The two cooling passages are acted upon by airflows which differ with respect to pressure and temperature, more highly compressed and therefore hotter air being employed in the upstream profile region. The cooler airflow is either tapped from a compressor stage further upstream or is obtained directly from the hot, more highly compressed airflow by pressure reduction. The advantages and disadvantages are essentially the same as those described above.

German Published Patent Application No. 695 04 240 describes a cooling method for a gas turbine power installation in which the high-pressure turbine region is cooled by a mixture of cooling air and steam, the steam proportion mass being greatly preponderant. The energy necessary for the generation of the steam is extracted from the gas turbine exhaust gas. A defined pressure drop generated in the cooling airflow is employed as the control parameter for the mass flow of the admixed cooling steam. An appliance for generating the desired pressure drop can be a heat exchanger by which the cooling air temperature is reduced. The actual cooling of the blading takes place "conventionally", i.e., there is only one cooling passage in each case for a coolant mixture (air/steam) within the blade/vane. The principle is only suitable for stationary installations or installations in fairly large marine vessels.

If "conventionally" cooled guide vanes and rotor blades, i.e., guide vanes and rotor blades cooled by an airflow through the inside of the blade/vane, are considered, the temperature during operation in the region of the leading edge/inlet edge is approximately at the level of that in the region of the trailing edge/outlet edge but is distinctly lower in the central profile region than at the leading edge and trailing edge. The maximum temperature difference is often even larger during accelerations, i.e., in a transient operating condition, because the leading edge and trailing edge heat up even more rapidly than the more voluminous and better cooled central region. Temperature differences induce thermal stresses, which have a negative effect on the component life. The locally extreme material temperatures at the inlet and outlet edges can damage the material grain structure, which likewise leads to a reduction in the life. An increase in the cooling air throughput only provides partial help at the cost of a reduced engine power or a poorer efficiency.

In contrast, it is an object of the present invention to provide a cooling air system for reducing the thermal load on the components in the turbine high-pressure region of gas turbines, which system—by reducing the temperature differences and the maximum temperatures in the component—provides a distinct increase in the component life and a noticeable improvement with respect to efficiency and power of the gas turbine overall.

SUMMARY

The components affected relate mainly, but not exclusively, to thermally highly loaded blades/vanes. Thus, in addition to guide vanes and/or rotor blades, other parts may also be thermally relieved by this cooling system. The blading is mainly intended to be associated with turbine stages of axial design, i.e., hot gas flows in a mainly axial direction through them.

Each of the blade/vanes may include at least three flow chambers over the profile length within the blade/vane aerofoil. The cooling air guidance from the compressor to the turbine includes at least one heat exchanger, by which the heat content of a partial flow of the cooling air is distinctly reduced. By this arrangement, cooling air is prepared which, despite its high pressure, has a moderate temperature level. The pressure level will also suffice for leading edge outlets from guide vanes and rotor blades near the combustion chamber. This additionally cooled cooling air is fed to the foremost and rearmost flow chambers of the blades/vanes. The at least one flow chamber in the central profile region is acted upon by warmer cooling air, which is supplied directly from the compressor without any deliberate heat exchange. This arrangement achieves, firstly, the effect that the leading and trailing edges of the blades/vanes remain cooler. Because the central blade/vane region is less strongly cooled, the temperature variation over the profile length is leveled out, i.e., the maximum temperature differences occurring are distinctly reduced and also, therefore, the thermally induced component stresses. In consequence, the blades/vanes may be more severely loaded mechanically, for example due to higher rotational speeds/centrifugal forces, or they may have a more thin-walled, filigree and therefore lighter design for the same load. Because of the reduced cooling air average temperature level, the cooling air quantity extracted per unit time may be reduced. The advantages with respect to efficiency and power of the gas turbine overall are apparent. The extra requirements with respect to design and weight for heat exchange and separate cooling air guides are outweighed by the advantages. The cooling air guided through the heat exchanger and the cooling air guided without heat exchange may initially have the same pressure and temperature level (the same or comparable extraction locations) but that different extraction locations with different thermodynamic values are also possible, for example, different compressor stages. The cooling air guidance, however, generally extends from the high-pressure region of the compressor to the high-pressure region of the turbine. In the case of multi-shaft gas turbines, there is a high-pressure compressor and a high-pressure turbine as structurally independent components which are mechanically connected by a separate high-pressure shaft. Such configurations also fall, without limitation, into the field of application of the invention.

DETAILED DESCRIPTION

Figure 1:
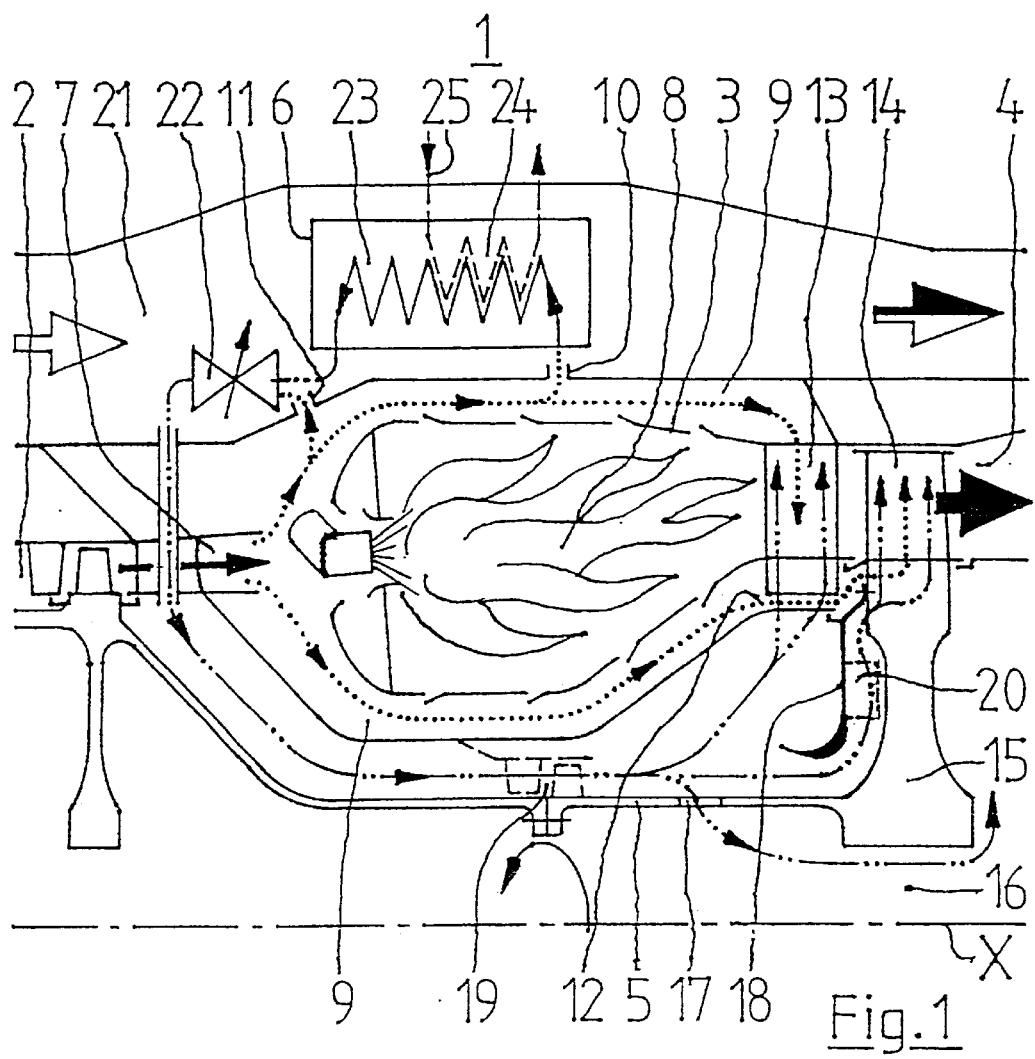
FIG. 1 is a partial longitudinal cross-sectional view through a gas turbine in the high-pressure and combustion chamber region.

The cooling system 1 is described in conjunction with a fan engine, i.e., a bypass turbojet engine, for example. Of this, only the upper half and also only the high-pressure and combustion chamber regions are illustrated. The compressor 2 is illustrated on the left, the turbine 4 is illustrated on the right and the combustion chamber 3 is illustrated in the center. The aircraft engine is of axial type throughout so that the main flow and the bypass flow extend essentially horizontally from left to right. The longitudinal center line X of the engine may be recognized and, above it, the components of the core engine. At the top is the bypass duct 21. The compressor 2 is driven by the turbine 4 by a shaft 5. Because, for example, a two-shaft engine is provided, the compressor 2 is, specifically, a high-pressure compressor, the turbine 4 is a high-pressure turbine and the shaft 5 is therefore a high-pressure shaft. To provide a better general view, the constituent elements of the low-pressure region, such as, for example, the low-pressure shaft, are not illustrated. Of the compressor 2, a guide vane ring, a rotor blade ring with disc and, as the transition element to the combustion chamber 3, the combustion chamber diffuser 7 are illustrated. The combustion chamber 3 includes the inner high-temperature zone 8, which is symbolized by flames, where the hot oxidation of the fuel with atmospheric oxygen occurs, and the outer combustion chamber shell 9 through which only highly compressed air flows. The turbine 4 (high-pressure turbine) is indicated by a single stage, i.e., with a ring of guide vanes 13 at the combustion chamber end and a ring of rotor blades 14 on a turbine disc 15 following it downstream. In each case, the cooling air system 1 has the task of cooling the thermally critical guide vanes and rotor blades 13, 14 in an optimum manner. For this purpose, three cooling airflows are required with very different temperatures but at comparable pressures. In this arrangement, at least one aerodynamically low-loss heat exchanger 6 is necessary which, in this case, is located in the cool bypass duct 21. The whole of the cooling air quantity required is extracted, in the present case, downstream of the combustion chamber diffuser 7 in the region of the combustion chamber shell 9. Specifically, three separate extraction locations 10, 11, 12 are illustrated, of which the first (10) leads directly to the heat exchanger 6. The second (11) leads to a control and mixing valve 22 and the third (12) leads from the downstream combustion chamber end to the rotor blades 14 of the turbine 4. A further extraction location is located at the radially outer end of each guide vane 13, at the transition to the combustion chamber shell 9.

A plurality of flow paths for the cooling air is illustrated. The paths of the hotter cooling air are shown dotted and the paths of the colder cooling air coming from the heat exchanger 6 are indicated by double chain-dotting.

Hotter cooling air is led directly through the combustion chamber shell 9 radially from the outside (top) into the central profile region of the guide vanes 13 and likewise via the extraction location 12 radially from the inside (bottom) into the central profile region of the rotor blades 14 of the turbine 4.

A partial flow of the cooling air is led from the extraction location 10 into the heat exchanger 6 in order to reduce the cooling air temperature. Generally, the heat exchanger 6 is an air/air heat exchanger, the airflow accepting the heat being the fan outlet air (bypass air) in this case. On this point, see the left-hand region 23. A further heat exchange possibility is indicated in the right-hand region 24, in fact from the cooling air to the fuel 25 of the engine. In the illustrated example embodiment, the two regions 23, 24 may be spatially separated, i.e., they may form separate subassemblies/modules. After emerging from the heat exchanger 6, the cooling air (which is now substantially colder) is guided through a control and mixing valve 22, which also has a supply line for the hotter cooling air coming from the extraction location 11. The temperature of the cooling air emerging from the control and mixing valve may be specifically adjusted by mixing the cooled and the uncooled cooling air while varying the quantity ratio. The volume flow of this cooling air may also be adjusted by the degree of the valve opening, in the extreme case from "zero" to a maximum value. The temperature of this cooling air may therefore be varied between the value at the compressor outlet and the value at the heat exchanger outlet. The further flow path of this cooled cooling air leads, in this case, through struts of the combustion chamber diffuser 7 into the region of the shaft 5 and along the latter into the turbine region. Because the heat exchanger 6 and the control and mixing valve 22 lead to certain pressure losses in the cooling airflow, it may be necessary to raise the pressure level again. For this purpose, the Figures illustrate two examples. An additional cooling air compressor, which is seated directly on the shaft 5 as an axial compressor, is designated by 19. As an alternative, a cooling air compressor which is seated on a cover plate 18, which also rotates, on one side of the turbine disc 15 as a centrifugal compressor, is designated by 20. It is possible to locate a cooling air compressor outside the core engine, for example, on an equipment carrier, the drive power being extracted from an engine shaft. Independently of the presence of one of the cooling air compressors described above, the flow path of the cooled cooling air finally leads into a flow chamber near the leading edge and into one near the trailing edge of each blade/vane into the guide vanes and rotor blades 13, 14. Represented is an aerodynamically parallel connection of the guide vanes to the rotor blades with a distribution of the cooled cooling airflow. It is also possible to connect the guide vanes to the rotor blades aerodynamically in series, in which case the cooled cooling air would enter radially from the outside into the guide vanes and the cooling air proportion not admixed to the hot gas flow would emerge radially at the inside from the guide vanes and would enter the rotor blades. A further flow path for the cooled cooling air may be recognized from the Figures. This flow path leads through openings 17 into the inside of the shaft 5 and further through the central opening 16 of the turbine disc 15. This has the purpose of matching the central region of the turbine disc 15, with respect to temperature, to the peripheral and blading region and, by this arrangement to minimize thermal stresses in the turbine disc 15 itself.

Figure 2:
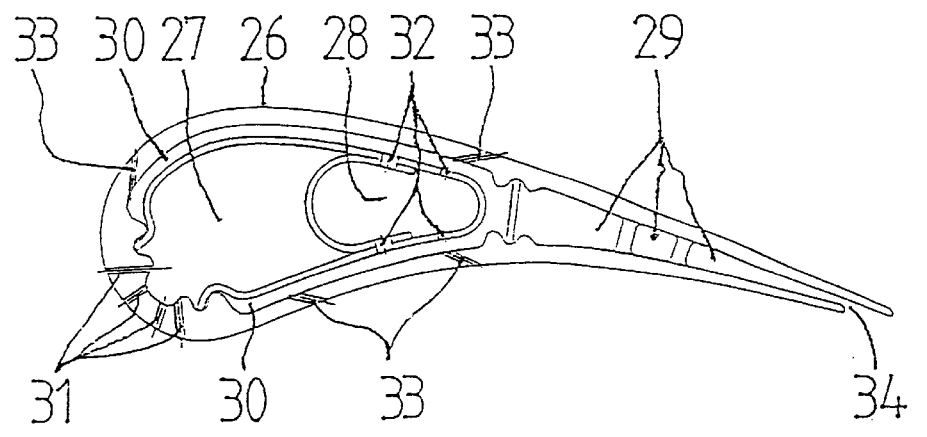
FIG. 2 is a cross-sectional view through a blade/vane.

The flow guidance in the blades/vanes is further explained with reference to FIG. 2. The blade/vane 26 has a construction which is typical of guide vanes but the principle may also be transferred to rotor blades. Three flow chambers 27, 28, 29 are located within the hollow blade/vane 26, it being necessary to allocate an additional intermediate space 30 volumetrically and aerodynamically to the central flow chamber 28. The front and rear flow chambers 27, 29 are acted upon by the same, cooled cooling air—coming from the heat exchanger or from the control and mixing valve. The central flow chamber 28, on the other hand, is supplied with distinctly hotter, uncooled cooling air. Cooling air holes 31, which permit cooling air to emerge from the front flow chamber 27, are located in the region of the profile stagnation point on the blade/vane leading edge. The central flow chamber 28 permits the hotter cooling air to emerge via cooling air holes 32 in the manner of impingement cooling, initially into an intermediate space 30 which, relative to the profile, extends further forward than the flow chamber 28 itself, a certain heat exchange to the flow chamber 27 having to be expected through the thin, inner-separating wall. The final emergence of the cooling air from the blade/vane profile occurs via cooling air holes 33. The rear flow chamber 29 is largely formed by cast contours and includes, in this location, a cooling air gap 34 at the blade/vane trailing edge as outlet.

Figure 3:
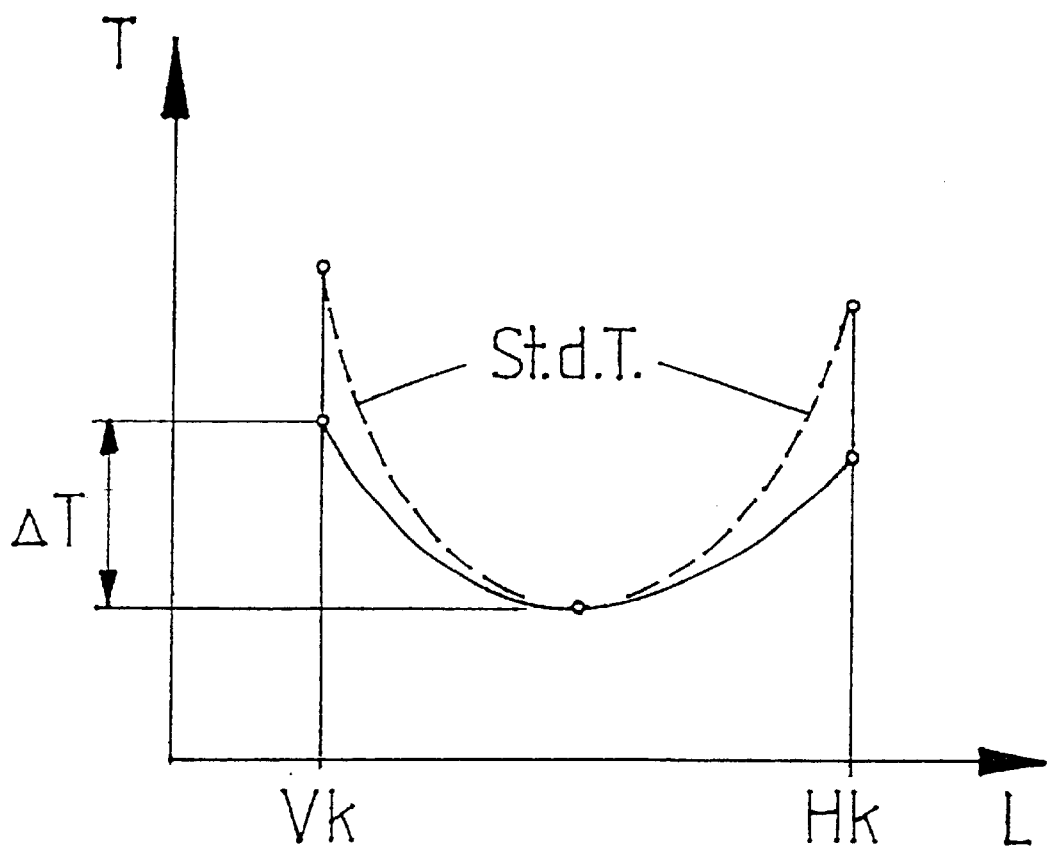
FIG. 3 is a graph illustrating two temperature curves along the blade/vane chord.

FIG. 3 qualitatively compares the temperature variation over the profile length in the case of a conventional blade/vane, i.e., with cooling by one airflow, with the temperature variation in the case of a blade/vane according to the present invention. T represents temperature, L represents a length coordinate in the profile longitudinal direction, for example on the profile center line (profile chord) or on the profile surface, Vk represents leading edge and Hk represents trailing edge. DT represents the maximum temperature difference in the respective profile section and is therefore a measure of the thermally induced component stresses. It may be seen that the minimum temperature in the central profile region is at the same or a comparable level for the two examples. Toward the two ends of the blade/vane, the conventional arrangement (interrupted curve) is, however, distinctly hotter with a reduced life as the result. If, however, the maximum temperature in the case of the conventionally cooled blade does not exceed a permissible limiting value from the point of view of material, it is more sensible to raise the curve of the blade/vane according to the present invention sufficiently far for its maximum value also to correspond approximately to the material limiting value.

What is claimed is:

1. A cooling air system for reducing thermal loading on components in a turbine high-pressure region of a gas turbine, which includes at least one first compressor, a combustion chamber and a turbine, comprising:

a plurality of blades/vanes through which cooling air flows and including a plurality of separate flow chambers within a blade/vane aerofoil for different airflows, each blade/vane having a first flow chamber in a region of its leading edge, at least one second flow chamber in a central region of its profile and a third flow chamber in a region of its trailing edge; and a cooling air guidance arrangement surrounding a high-temperature zone of the combustion chamber, the cooling air guidance arrangement configured to guide cooling air from one of the high-pressure region and an outlet region of the first compressor into a blading of the high-pressure region of the turbine, the cooling air guidance arrangement including at least one heat exchanger configured to reduce a temperature of a partial flow of the cooling air from the first compressor and at least one flow connection from an outlet of the heat exchanger to the first flow chamber and the third flow chamber of each blade/vane, the cooling air guidance arrangement extending directly to the at least one second flow chamber and bypassing the heat exchanger.

2. The cooling air system according to claim 1 further comprising a fan engine having a fan disposed in a bypass duct, wherein the heat exchanger is arranged downstream of the fan.

3. The cooling air system according to claim 1, further comprising a second cooling air compressor corresponding to cooling air from the heat exchanger, the second cooling air compressor being driven one of directly and indirectly by a shaft connecting the first compressor to the turbine.

4. The cooling air system according to claim 1, further comprising a device configured to regulate an air quantity and an air temperature of the cooling air from the heat exchanger by an admixture of hotter cooling air that is not guided through the heat exchanger.

5. The cooling air system according to claim 4, wherein the device configured to regulate the air quantity and the air temperature of the cooling air from the heat exchanger includes a control and mixing valve.

6. The cooling air system according to claim 1, further comprising at least one location for extraction of cooling air provided downstream of the first compressor in a region of a combustion chamber shell.

7. The cooling air system according to claim 5, wherein a cooling air guidance arrangement for a partial flow of cooling air from one of the heat exchanger and the control and mixing valve includes a flow path through a central opening of at least one turbine disc.

8. The cooling air system according to claim 1, wherein the heat exchanger includes a first region having a cooling air/air heat exchanger and a second region having a cooling air/fuel heat exchanger, the first region and the second region being one of spatially combined and separate.

* * * * *